US012651580B2

(12) United States Patent
Chappalli

(10) Patent No.: US 12,651,580 B2

(45) Date of Patent: Jun. 9, 2026

(54) BACKLIGHT RECONSTRUCTION AND COMPENSATION

(71) Applicant: Apple Inc., Cupertino, CA (US)

(72) Inventor: Mahesh B. Chappalli, San Jose, CA (US)

(73) Assignee: Apple Inc., Cupertino, CA (US)

( * ) Notice: Subject to any disclaimer, the term of this patent is extended or adjusted under 35 U.S.C. 154(b) by 337 days.

(21) Appl. No.: 18/478,588

(22) Filed: Sep. 29, 2023

(65) Prior Publication Data

US 2024/0029687 A1 Jan. 25, 2024

Related U.S. Application Data

(63) Continuation of application No. 17/940,835, filed on Sep. 8, 2022, now Pat. No. 11,790,870, which is a continuation of application No. 17/149,415, filed on Jan. 14, 2021, now Pat. No. 11,475,865.

(60) Provisional application No. 63/072,091, filed on Aug. 28, 2020.

(51) Int. Cl.
*G09G 5/10* (2006.01)
*G09G 3/20* (2006.01)

(52) U.S. Cl.
CPC ............. *G09G 5/10* (2013.01); *G09G 3/2003* (2013.01); *G09G 2310/0237* (2013.01); *G09G 2320/0233* (2013.01)

(58) Field of Classification Search
CPC ................... G09G 5/10; G09G 3/2003; G09G 2310/0237; G09G 2320/0233; G09G 2320/0242; G09G 2320/0646; G09G 2340/06; G09G 2360/16; G09G 3/3426
See application file for complete search history.

(56) References Cited

U.S. PATENT DOCUMENTS

| | | | | |
|---|---|---|---|---|
| 8,982,036 | B2 * | 3/2015 | Kim | G09G 3/3648 345/102 |
| 10,504,453 | B1 | 12/2019 | Jung et al. | |
| 10,571,744 | B1 * | 2/2020 | Chang | G09G 3/3685 |
| 10,643,549 | B1 * | 5/2020 | Jung | G09G 3/3648 |
| 11,100,830 | B2 | 8/2021 | Aksit | |
| 2007/0232241 | A1 | 10/2007 | Carley et al. | |
| 2009/0115718 | A1 | 5/2009 | Qiao et al. | |
| 2010/0053132 | A1 | 3/2010 | Miyamoto | |

(Continued)

FOREIGN PATENT DOCUMENTS

| | | | |
|---|---|---|---|
| CN | 101329459 | A | 12/2008 |
| CN | 108389552 | A | 8/2018 |

(Continued)

OTHER PUBLICATIONS

Notice of Preliminary Rejection for Korean Patent Application No. 10-2022-0106806, dated Nov. 24, 2023; 4 pgs.

(Continued)

*Primary Examiner* — Rodney Amadiz
(74) *Attorney, Agent, or Firm* — Fletcher Yoder, P.C.

(57) ABSTRACT

A processor or other circuitry may obtain emissive element strength information for an array of emissive elements of an electronic display. The processor or other circuitry may reconstruct backlight information at multiple locations within the electronic display. The processor or other circuitry also compensates display of image data based at least in part on the reconstructed backlight information.

20 Claims, 8 Drawing Sheets

(56) References Cited

U.S. PATENT DOCUMENTS

| | | | | |
|---|---|---|---|---|
| 2010/0156927 | A1 | 6/2010 | Takase | |
| 2010/0182346 | A1* | 7/2010 | Sano .................... | G09G 3/3413 345/690 |
| 2012/0287146 | A1 | 11/2012 | Elliot et al. | |
| 2012/0287167 | A1 | 11/2012 | Higgins et al. | |
| 2013/0215360 | A1 | 8/2013 | Pollack et al. | |
| 2013/0265346 | A1 | 10/2013 | Yu et al. | |
| 2017/0244376 | A1 | 8/2017 | Morris et al. | |
| 2021/0350732 | A1 | 11/2021 | Aksit | |
| 2021/0358427 | A1 | 11/2021 | Wang et al. | |
| 2022/0084474 | A1 | 3/2022 | Rajamani et al. | |

FOREIGN PATENT DOCUMENTS

| | | | |
|---|---|---|---|
| EP | 2099019 | A1 | 9/2009 |
| EP | 2477176 | A1 | 7/2012 |
| EP | 3147893 | A1 | 3/2017 |
| JP | 2008116850 | A | 5/2008 |
| JP | 2009069468 | A | 4/2009 |
| JP | 2010145773 | A | 7/2010 |
| JP | 2019095559 | A | 6/2019 |
| KR | 10-20120128091 | A | 11/2012 |
| KR | 10-20140120819 | A | 10/2014 |
| WO | 2013038560 | A | 3/2013 |

OTHER PUBLICATIONS

International Search Report and Written Opinion for PCT Patent Application No. PCT/US2021/047016 dated Nov. 19, 2021; 20 pgs.
Korean Search Report for Korean Patent Application No. 10-2023-7009972 dated Apr. 6, 2023; 16 pgs.

* cited by examiner

BACKLIGHT RECONSTRUCTION AND COMPENSATION

CROSS-REFERENCE TO RELATED APPLICATIONS

This application is a continuation of U.S. application Ser. No. 17/940,835, entitled "Backlight Reconstruction and Compensation, filed Sep. 8, 2022, which is a continuation of U.S. application Ser. No. 17/149,415, entitled "Backlight Reconstruction and Compensation," filed Jan. 14, 2021, now U.S. Pat. No. 11,475,865, which claims priority to U.S. Provisional Application No. 63/072,091, entitled "Backlight Reconstruction and Compensation," filed Aug. 28, 2020, each of which is incorporated by reference in its entirety for all purposes.

BACKGROUND

The present disclosure relates generally to reconstructing a brightness and/or a color of a backlight at one or more pixels based on a strength (e.g., point spread function (PSF)) of backlight emissive elements (e.g., light emitting diode (LEDs)).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays may use one or more emissive elements (e.g., LEDs) to provide backlighting to display images on the electronic display. In embodiments where more than a single backlight emissive element is used, the response of the one or more emissive elements may have different strengths of emissivity. In other words, sending a signal to uniformly backlight at least a portion of the display may appear differently due to different strengths of emissivity of different backlight emissive elements of the display. These different strengths of the emissivity of the different emissive elements may be attributable to manufacturing process differences, different emissive element batches, differences in the different lines of transmission between a power supply and the respective emissive elements, and/or other differences in driving circuitry, the emissive elements, and/or the connections therebetween that may cause the different emissive elements to display different brightness levels. These differing brightness levels may cause artifacts to be visible on the display during operation of the display.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "one embodiment," "an embodiment," "embodiments," and "some embodiments" of the present disclosure are not intended to be interpreted as excluding the existence of additional embodiments that also incorporate the recited features.

An electronic display may utilize multiple emissive elements (e.g., LEDs) in an array (e.g., a two-dimensional array) to provide backlighting to the display in localized backlighting zones. Due to properties of the various emissive elements and/or other local backlighting differences between different backlighting zones, the backlight emissive elements may have differing strengths (e.g., point spread functions, referred to herein as PSFs) that may produce display artifacts. A point spread function may be used to model how light spreads and/or is distributed in space from some or from all backlight emissive elements. In some embodiments, the PSF for each backlight emissive element may be uniquely determined/modeled for a specific emissive element. As discussed in detail below, to address such issues, backlight reconstruction may be employed to determine the brightness and/or color at each pixel value based on the PSFs of the emissive elements and estimated brightness levels. Using the backlight reconstruction, the pixel values may be modified to account for the brightness and/or color of the backlight at each pixel position.

Figure 1:
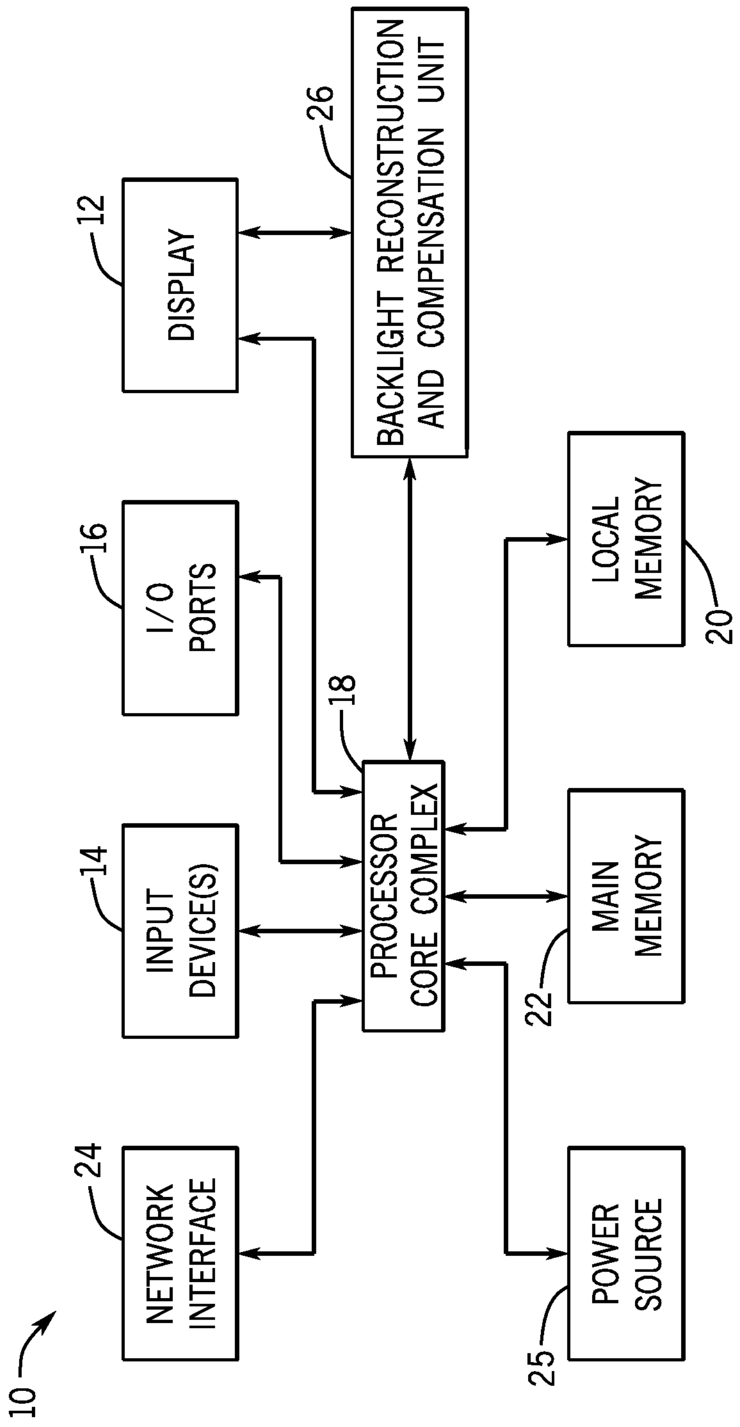
FIG. 1 is a block diagram of an electronic device with a display having emissive elements, where the electronic device includes backlight reconstruction and compensation (BRC) unit to reconstruct and compensate differences in strengths of emissive elements, in accordance with an embodiment of the present disclosure.

As will be described in more detail below, an electronic device 10 that uses such backlight reconstruction and compensation, such as the electronic device 10 shown in FIG. 1, may be any suitable electronic device, such as a computer, a mobile phone, a portable media device, a wearable device, a tablet, a television, a virtual-reality headset, and the like. Thus, it should be noted that FIG. 1 is merely an example of a particular implementation and is intended to illustrate the types of components that may be present in the electronic device 10.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 25, and a backlight reconstruction and compensation (BRC) unit 26. The various components described in FIG. 1 may include hardware elements (e.g., circuitry), software elements (e.g., a tangible, non-transitory computer-readable medium storing instructions), or a combination of both hardware and software elements. For example, the BRC unit 26 may be implemented as dedicated circuitry and/or instructions stored in the main memory storage device 22 that are executed using the processor core complex 18. Moreover, while the BRC unit 26 is referred to here as a "unit," this is meant to describe one example form that backlight reconstruction and compensation may take in an electronic device. Indeed, it may be unitary or modular in some cases, but may represent separate, non-unitary components implemented by separate components of the electronic device 10 in other cases. To provide one non-limiting example, backlight reconstruction may be independent of compensation (e.g., backlight reconstruction may be performed using software running on the processor core complex 18 while compensation may be performed by image processing circuitry in display pipeline). It should also be noted that the various depicted components may be combined into fewer components or separated into additional components. For example, the local memory 20 and the main memory storage device 22 may be included in a single component.

The processor core complex 18 may execute instruction stored in local memory 20 and/or the main memory storage device 22 to perform operations, such as generating and/or transmitting image data. As such, the processor core complex 18 may include one or more processors, such as one or more microprocessors, one or more application specific processors (ASICs), one or more field programmable logic arrays (FPGAs), one or more graphics processing units (GPUs), or the like. Furthermore, as previously noted, the processor core complex 18 may include one or more separate processing logical cores that each process data according to executable instructions.

The local memory 20 and/or the main memory storage device 22 may store the executable instructions as well as the data to be processed by the cores of the processor core complex 18. Thus, the local memory 20 and/or the main memory storage device 22 may include one or more tangible, non-transitory, computer-readable media. For example, the local memory 20 and/or the main memory storage device 22 may include random access memory (RAM), read only memory (ROM), rewritable non-volatile memory such as flash memory, hard drives, optical discs, and the like.

The network interface 24 may facilitate communicating data with other electronic devices via network connections. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G, LTE, or 5G cellular network. The network interface 24 includes one or more antennas configured to communicate over network(s) connected to the electronic device 10.

The power source 25 may include any suitable source of energy, such as a rechargeable lithium polymer (Li-poly) battery and/or an alternating current (AC) power converter.

The I/O ports 16 may enable the electronic device 10 to receive input data and/or output data using port connections. For example, a portable storage device may be connected to an I/O port 16 (e.g., Universal Serial Bus (USB)), thereby enabling the processor core complex 18 to communicate data with the portable storage device. The I/O ports 16 may include one or more speakers that output audio from the electronic device 10.

The input devices 14 may facilitate user interaction with the electronic device 10 by receiving user inputs. For example, the input devices 14 may include one or more buttons, keyboards, mice, trackpads, and/or the like. The input devices 14 may also include one or more microphones that may be used to capture audio.

The input devices 14 may include touch-sensing components in the electronic display 12. In such embodiments, the touch sensing components may receive user inputs by detecting occurrence and/or position of an object touching the surface of the electronic display 12.

The electronic display 12 may include a display panel with one or more display pixels. The electronic display 12 may control light emission from the display pixels to present visual representations of information, such as a graphical user interface (GUI) of an operating system, an application interface, a still image, or video content, by display image frames based at least in part on corresponding image data. In some embodiments, the electronic display 12 may be a display using liquid crystal display (LCD), a self-emissive display, such as an organic light-emitting diode (OLED) display, or the like.

The BRC unit 26 may be used to reconstruct a backlight for the electronic display 12 using PSFs of emissive elements of the electronic display 12. The backlight reconstruction is used to determine the brightness and/or color of the backlight at each pixel value based on the PSFs and estimated brightnesses. Using the determined brightnesses and/or colors, the BRC unit 26 is used to compensate for the different brightnesses and/or colors of the emissive elements backlighting specific pixel locations. For example, the BRC unit 26 may modify the image values for the respective pixel locations inverse to any color and/or brightness fluctuations of the local backlights at the pixel locations.

Figure 2:
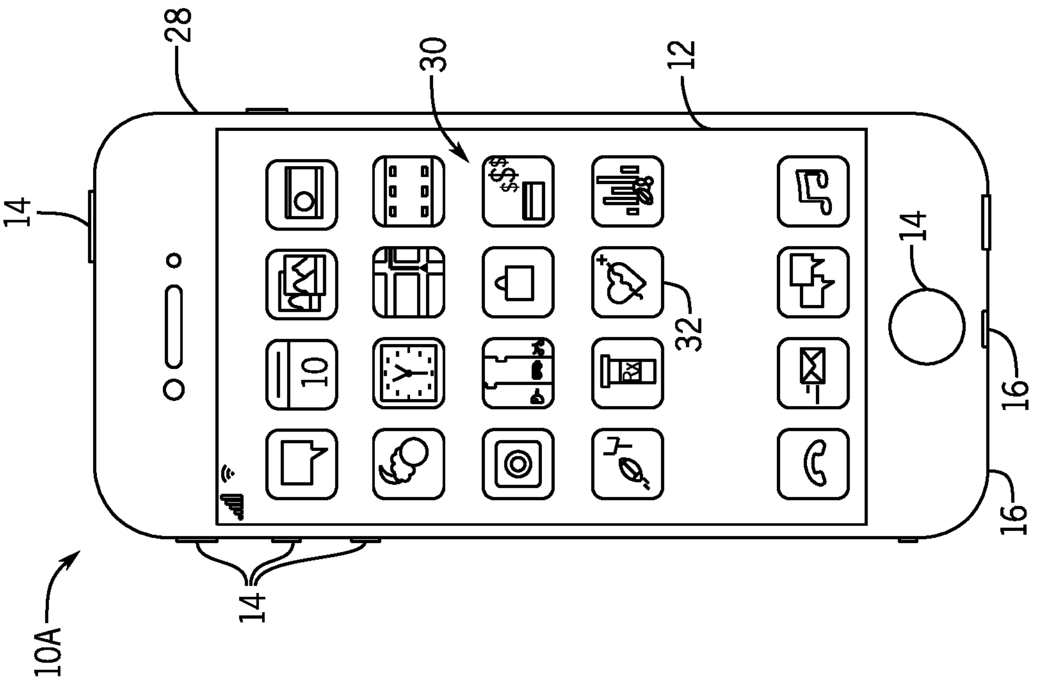
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any IPHONE® model available from Apple Inc.

The handheld device 10A includes an enclosure 28 (e.g., housing). The enclosure 28 may protect interior components from physical damage and/or shield them from electromagnetic interference. In the depicted embodiment, the electronic display 12 is displaying a graphical user interface (GUI) 30 having an array of icons 32. By way of example, when an icon 32 is selected either by an input device 14 or a touch-sensing component of the electronic display 12, a corresponding application may launch.

The input devices 14 may extend through the enclosure 28. As previously described, the input devices 14 may enable a user to interact with the handheld device 10A. For example, the input devices 14 may enable the user to record audio, to activate or deactivate the handheld device 10A, to navigate a user interface to a home screen, to navigate a user interface to a user-configurable application screen, to activate a voice-recognition feature, to provide volume control, and/or to toggle between vibrate and ring modes. The I/O ports 16 may also extend through the enclosure 28. In some embodiments, the I/O ports 16 may include an audio jack to connect to external devices. As previously noted, the I/O ports 16 may include one or more speakers that output sounds from the handheld device 10A.

Figure 3:
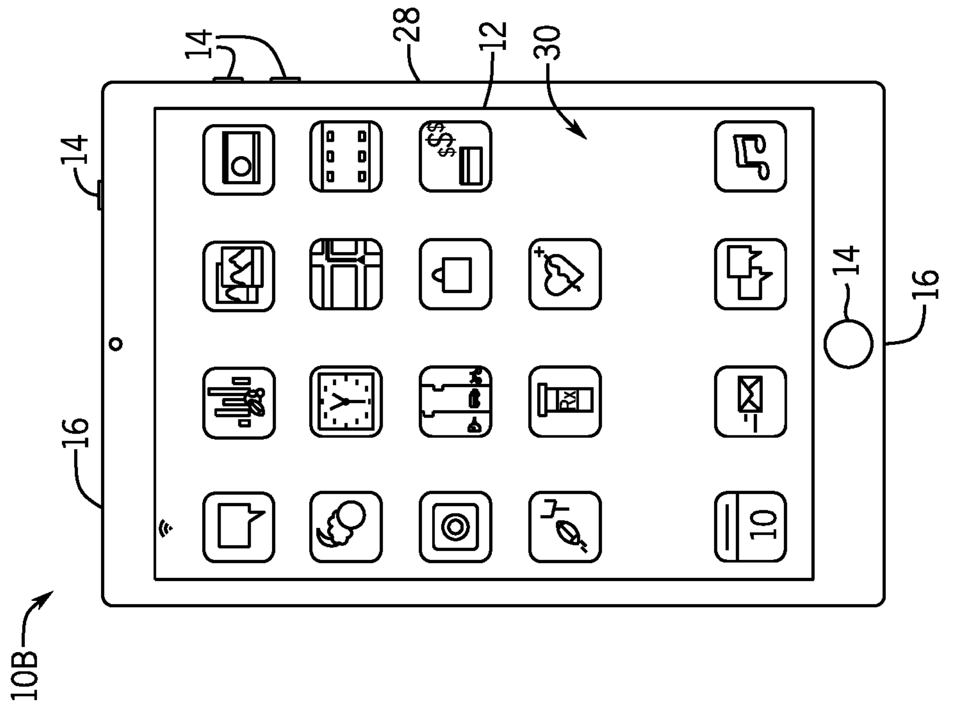
FIG. 3 is another example of the electronic device of FIG. 1, in accordance with an embodiment of the present disclosure.
Figure 4:
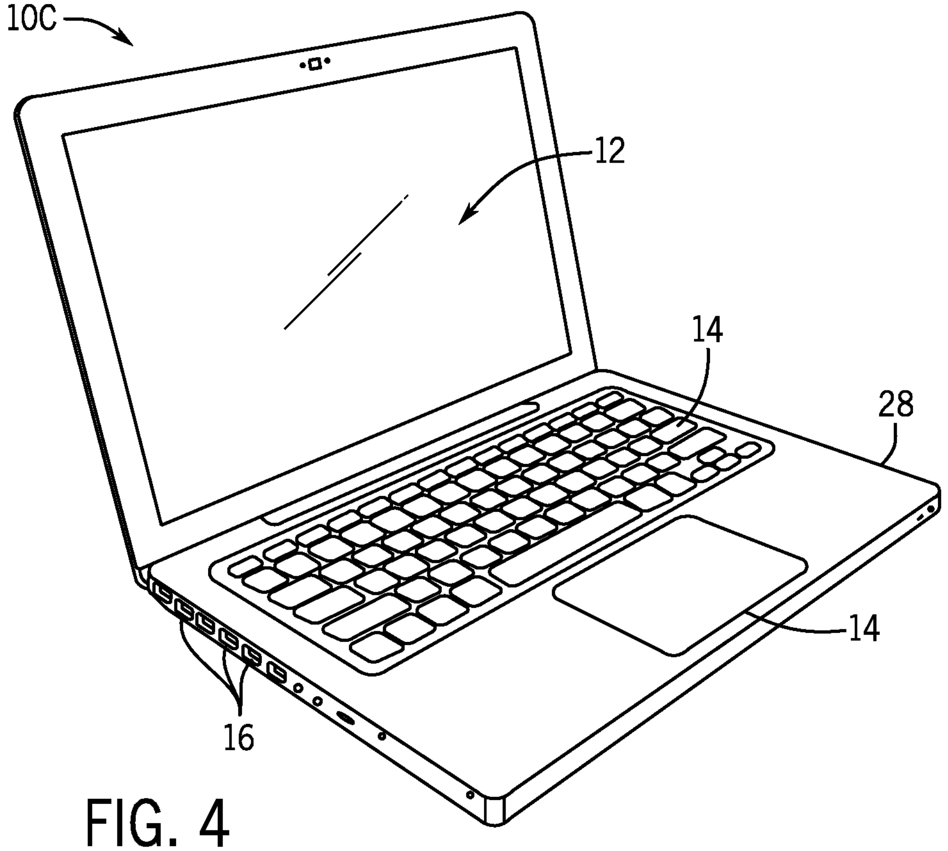
FIG. 4 is another example of the electronic device of FIG. 1, in accordance with an embodiment of the present disclosure.
Figure 5:
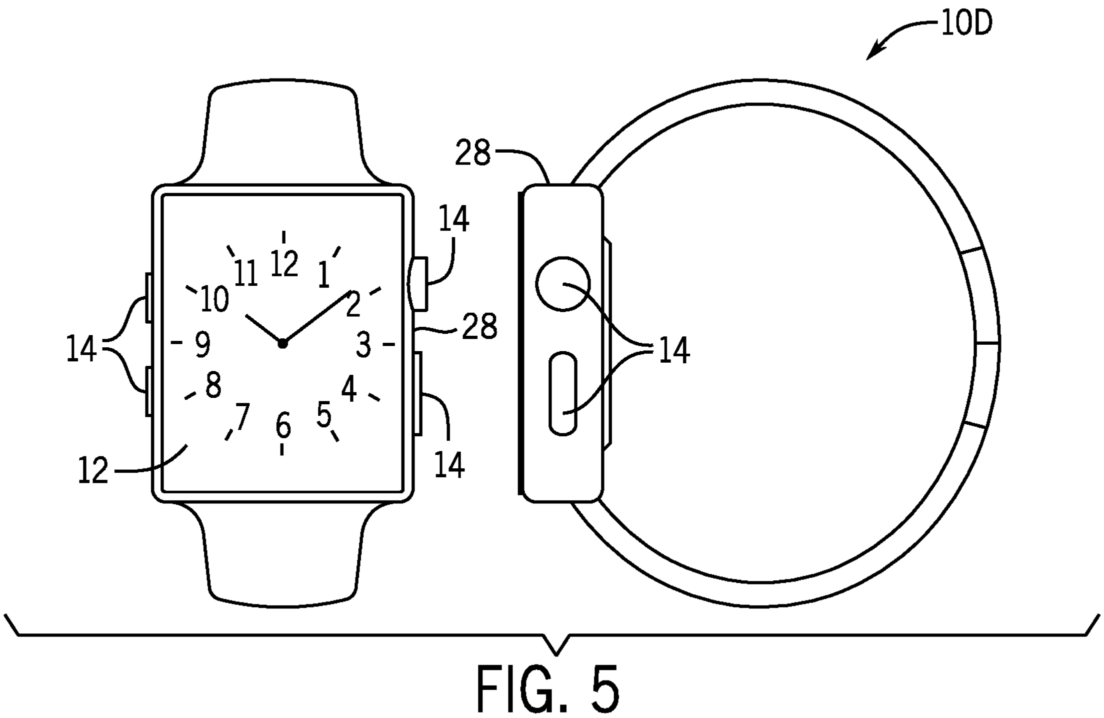
FIG. 5 is another example of the electronic device of FIG. 1, in accordance with an embodiment of the present disclosure.

Another example of a suitable electronic device 10 is a tablet device 10B shown in FIG. 3. For illustrative purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a wearable device 10D, is shown in FIG. 5. For illustrative purposes, the wearable device 10D may be any APPLE WATCH® model available from Apple Inc. As depicted, the tablet device 10B, the computer 10C, and the wearable device 10D each also includes an electronic display 12, input devices 14, and an enclosure 28.

Figure 6:
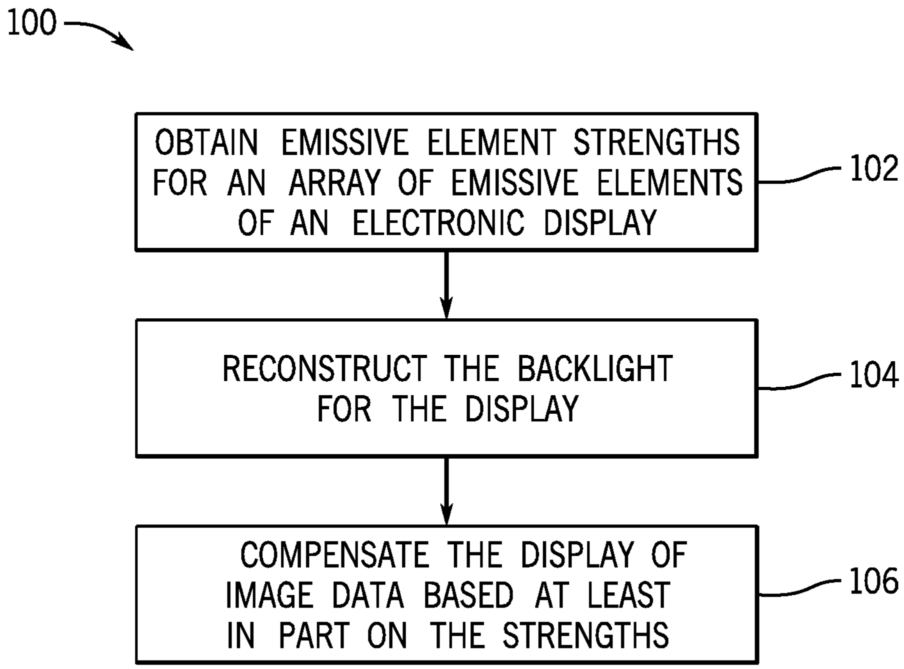
FIG. 6 is a flow diagram of a process for driving a display using backlight reconstruction, in accordance with an embodiment of the present disclosure.

FIG. 6 is a flow diagram of a process 100 that may be utilized by the BRC unit 26. Specifically, the BRC unit 26 may obtain emissive element strengths for an array of emissive elements of the electronic display 12 (block 102). The strengths may pertain to an overall brightness of the individual emissive elements and/or may refer to brightnesses at different wavelengths (e.g., different colors) of the emissive elements. The strengths of the pixels may be indicated using a point spread function (PSF) that provides different brightnesses and/or colors for different pixel values for one or more emissive elements of the display. Using the strengths, the BRC unit 26 reconstructs the backlight for the electronic display 12 (block 104). For instance, the BRC unit 26 may determine a brightness and/or color for one or more pixels of the electronic display 12. For instance, the BRC unit 26 may determine what the backlight looks like at a point (e.g., a pixel) of the electronic display 12. The reconstruction may include defining two or more overlapped zones and/or non-overlapped zones of pixels to determine the brightnesses and/or color. The overlapped zones may be defined as extensions of the non-overlapped zones. Using the determined brightness and/or color, the BRC unit 26 compensates for the backlight variance based at least in part on the strengths (block 106). For instance, the image data values (e.g., in a linear or gamma domain) of respective pixels may be compensated. In addition to or alternative to modifying image data values, the BRC unit 26 may cause the backlight driving to be compensated to increase uniformity.

Figure 7:
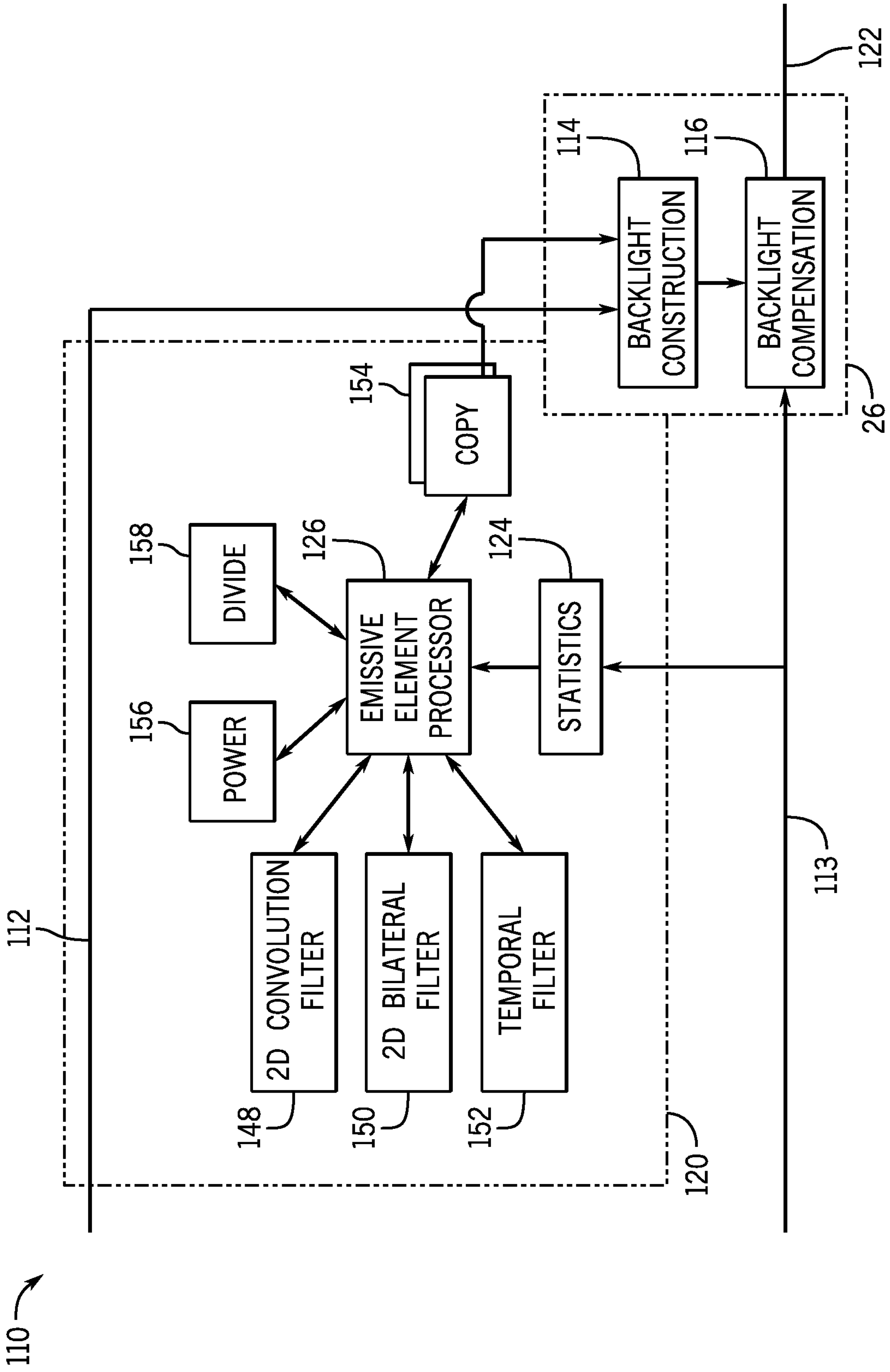
FIG. 7 is a block diagram of pixel contrast control (PCC) circuitry including the BRC unit of FIG. 1, in accordance with an embodiment of the present disclosure.

FIG. 7 is a block diagram of pixel contrast control (PCC) circuitry 110 that includes the BRC unit 26. The BRC unit 26 receives emissive element strengths 112 and image data 113. As illustrated, the BRC unit 26 includes a backlight reconstruction component 114 and a backlight compensation component 116. The BRC unit 26 also receives brightness estimations 118 from brightness estimation circuitry 120. Brightness estimation is used to estimate the brightness of individual addressable backlight zones based on pixel values of the content to enhance contrast while preserving detail and reducing (e g, minimizing) halo and flicker and to generate compensated image data 122 that compensates for backlight brightnesses and/or colors. Statistics circuitry 124 generates statistics including local statistics based on overlapped zones of the electronic display 12, local statistics based on non-overlapped zones of the electronic display 12, and/or global statistics. An emissive element processor 126 uses the statistics to compute brightnesses for the individually addressable backlight zones based on the pixel values of the content. The local statistics may be particularly useful in displays with local dimming while global statistics may be applicable to displays with global backlight and to displays with local dimming. The statistics calculated in the statistics circuitry 124 may include brightness maximums, brightness minimums, brightness averages, en-gamma/de-gamma information, uniformity statistics, and/or other information.

Figure 8:
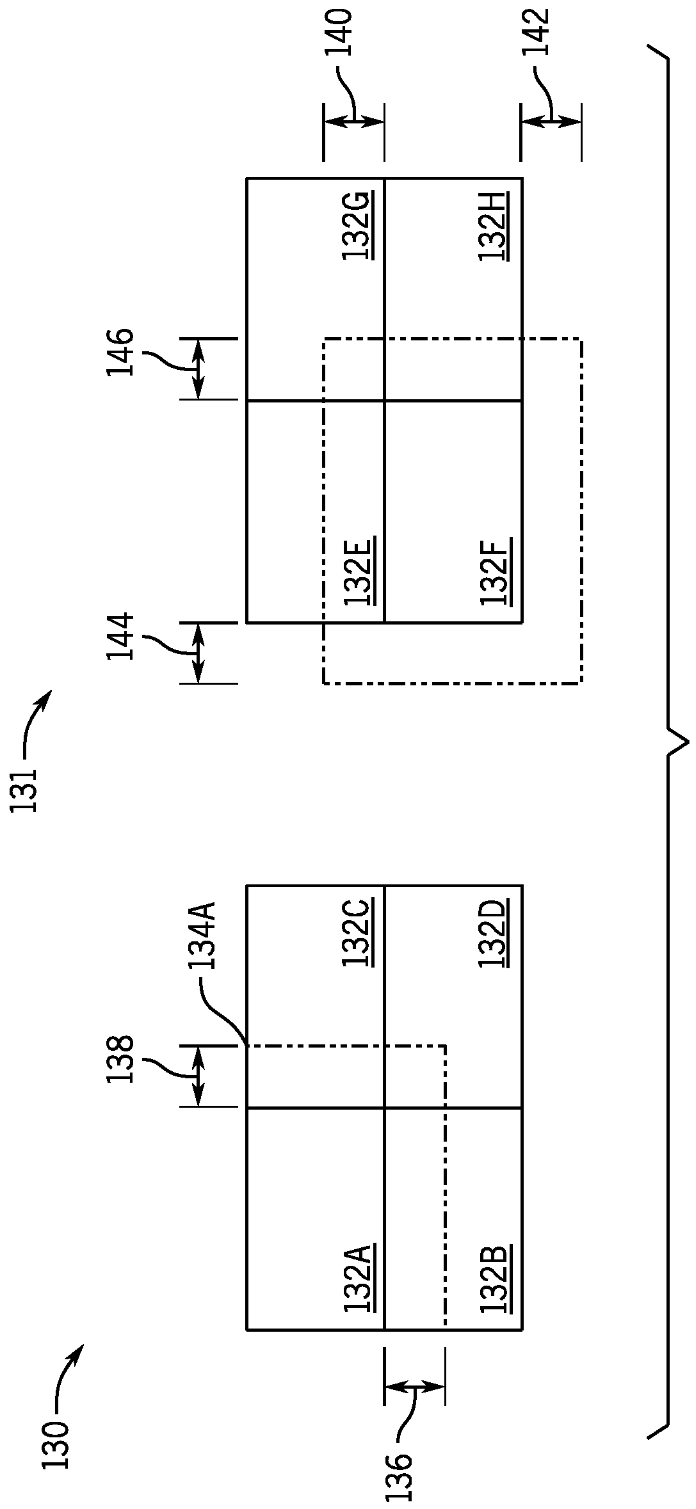
FIG. 8 is a graph of overlapping and non-overlapping portions of a display that may be used by the PCC circuitry of FIG. 7, in accordance with an embodiment of the present disclosure.

FIG. 8 is a graph of portions 130 and 131 of the electronic display 12. In the portions 130 and 131, non-overlapped zones 132 (individually referred to as non-overlapped zones 132A, 132B, 132C, 132D, 132E, 132F, 132G, and 132H). The portions 130 and 131 also includes include overlapped zones 134 (individually referred to as 134A and 134B). At edges of an active area of the electronic display 12, the overlapped zones 134 start at an edge of a respective non-overlapping zone 132 and extends beyond the borders of the non-overlapping zone 132. As illustrated, the overlapped zone 134A includes a significant portion (e.g., all) of the non-overlapped zone 132A and a vertical overlap 136 that extends into portions of the non-overlapped zones 132B and 132D. Similarly, the overlapped zone 134A includes a horizontal overlap 138 that extends into portions of the non-overlapped zones 132C and 132D.

Away from the edge of the active area, the overlapped zones 134 may extend around a single non-overlapped zone 132 in multiple directions. For example, the overlapped zone 134B includes a significant portion of the non-overlapped zone 132F and a first vertical overlap 140 that extends above the non-overlapped zone 132F into non-overlapping zone 132E and 132G. The overlapped zone 134B also includes a second vertical overlap 142 extending below the non-overlapped zone 132F. The overlapped zone 134B also includes a first horizontal overlap 144 and a second horizontal overlap 146 that extends into non-overlapped zones 132G and 132H.

Returning to FIG. 7, the emissive element processor 126 may be included in the processor core complex 18, may be performed by the processor core complex 18, and/or may include a dedicated coprocessor that supplements processing of the processor core complex 18. The brightness estimations 118 are computed from the gathered statistics from the statistics circuitry 124 for emissive elements in a two-dimensional array of the emissive elements.

The emissive element processor 126 also utilizes a two-dimensional convolution filter 148. The two-dimensional convolution filter 148 applies any suitable filter that may provide filtering in two dimensions. In one example, the two-dimensional convolution filter 148 includes a two-dimensional FIR filter on elements of data sets sent over from the emissive element processor 126.

The emissive element processor 126 may also utilize a two-dimensional bilateral filter 150. The two-dimensional bilateral filter 150 applies a bilateral filter to values of a number (e.g., 7) of emissive elements and takes a weighted average of the number of emissive element values. The weighting in the two-dimensional bilateral filter 150 may be based on distance of the emissive elements from a reference point and/or intensity of the values of the respective emissive elements. In some embodiments, the weighting average may be based on long division. However, since the range of expected values is limited, an approximation of the results may be made from one or more data sets. If the initial approximation is sufficiently precise, the bilateral filtration process proceeds. If additional precision is to be used, a number (e.g., 1) of Newton-Raphson update steps may be used to converge from the initial approximation to the desired precision.

The emissive element processor 126 may also utilize a temporal filter 152 that is used to temporally filter data from the emissive element processor 126. For instance, when the temporal filter 152 is activated, it may function as an infinite impulse response (IIR) filter. The temporal filter 152 may be configured in a global filtering mode that causes the temporal filter to function as a classic IIR filter with asymmetric gains to allow for different transition speeds for dark-to-bright transitions and bright-to-dark transitions. When configured in a local filtering mode, for each emissive element, a local parameter is computed based on previous local parameters and emissive element differences.

A copy engine 154 may be used to write the brightness estimations 118 to the backlight reconstruction component 114. The copy engine 154 copies the elements of the input data set to multiple output locations with optional processing for each output. For instance, the optional processing may include enabling/disabling scaling using a scale factor, a minimum limit for a brightness threshold, scaling based on system level brightness settings, and/or other processing of the brightness estimations 118 from the emissive element processor 126.

A power function 156 may utilize hardware and/or software to adjust the brightness estimations based on power/power settings for the electronic device 10. A division function 158 may utilize hardware and/or software to perform division. For example, the division function 158 may include a hardware accelerator that utilizes a polynomial approximation of the division where the polynomial used to approximate the division is based on the input range of the value being divided. When an additional precision is to be used for the long division, the polynomial approximation may converge to the point of precision using a Newton-Raphson update step.

Figure 9:
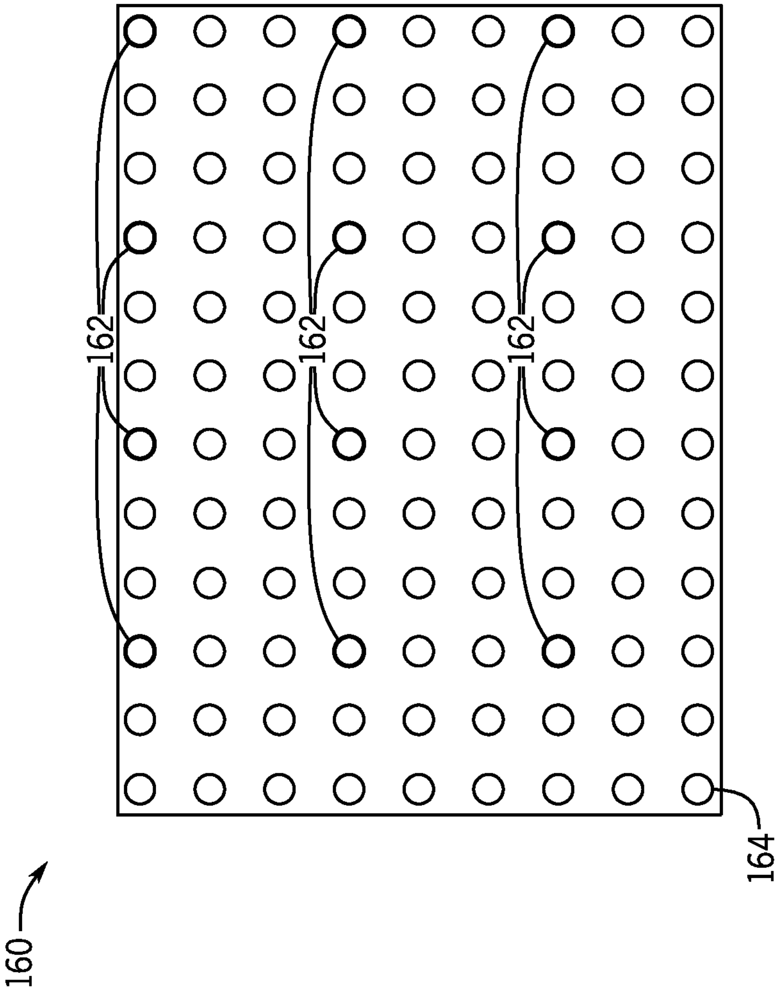
FIG. 9 is a graph of a backlight array with emissive elements and grid locations interspersed between the emissive elements and used to reconstruct the backlight, in accordance with an embodiment.

Backlight reconstruction may utilize a backlight grid. The backlight grid includes a grid of the emissive elements and specifies a number of intermediate points in between the emissive elements. For example, FIG. 9 illustrates an example grid 160 that represents at least a portion of backlighting for the electronic display 12. As illustrated, the grid 160 includes twelve emissive elements 162 in three rows. As illustrated, grid points 164 are dispersed between the emissive elements 162. The distribution, location, and/or number of the grid points 164 may be set using corresponding input parameters. For instance, an offset and/or spacing parameter may be used to set how far to offset a grid point 164 from an edge of the active area of the electronic display 12, from another grid point 164, and/or from an emissive element 162. Furthermore, a number of rows or columns of grid points 164 may be set using respective number parameters.

Figure 10:
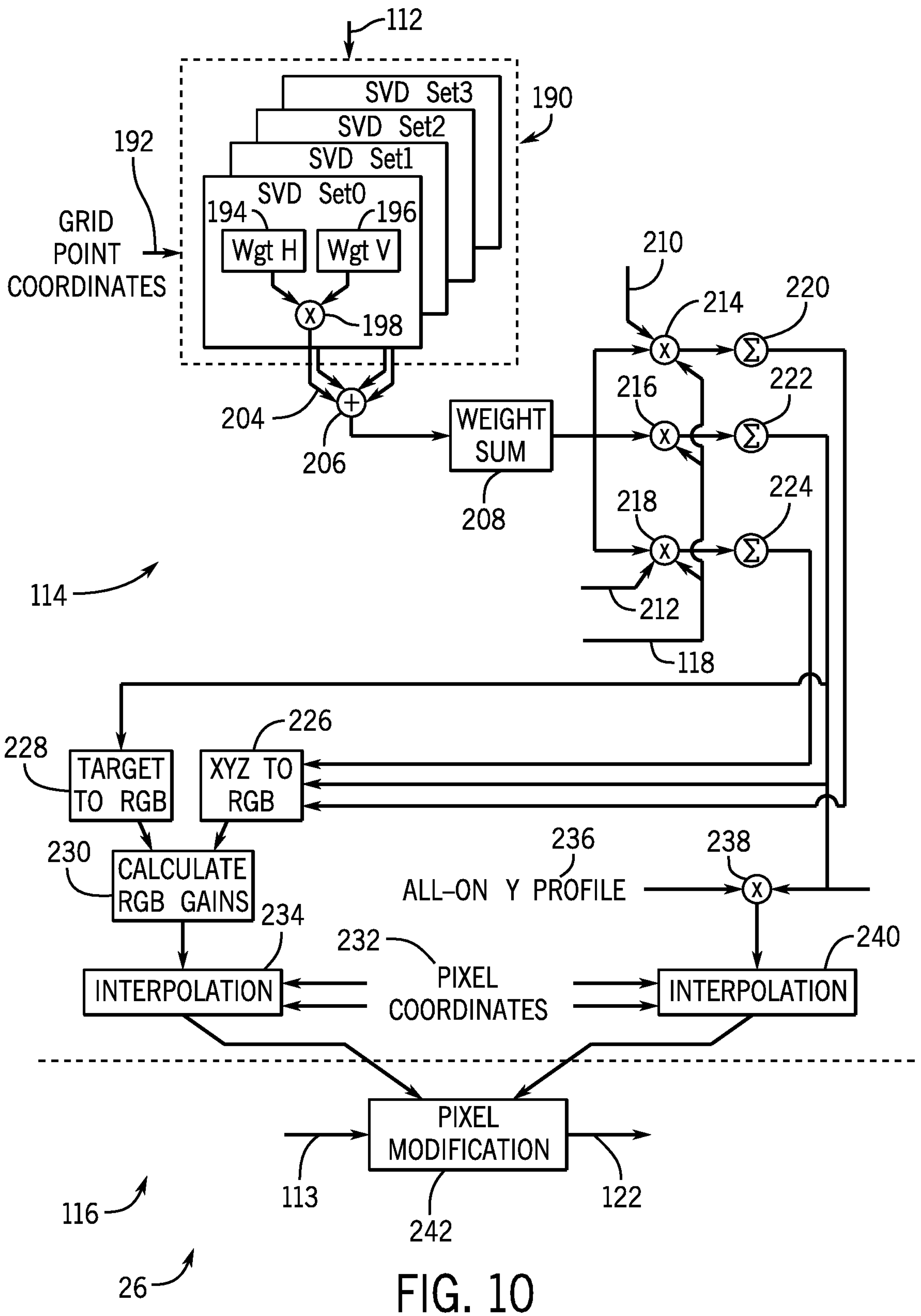
FIG. 10 is a block diagram of the BRC unit of FIG. 1, in accordance with an embodiment.

FIG. 10 illustrates a block diagram of an embodiment of the BRC unit 26. As illustrated, the BRC receives emissive element strengths 112. The emissive element strengths 112 may be received in singular value decomposition (SVD) sets 190. Accordingly, in such embodiments, the reconstruction of the backlight may be performed by applying the strengths for one or more (e.g., each) emissive element 162 of the backlight of the electronic display 12. The SVD sets 190 may be fetched from the local memory 20 using a direct memory access (DMA) channel. In some embodiments, the SVD sets 190 may be stored in the local memory 20 in a raster-scan order of the associated emissive elements 162 associated the emissive element strengths 112. The number of SVD sets 190 may be controlled using a parameter set for the BRC unit 26 using an SVD number parameter.

The reconstruction of the backlight at each grid point 164 is achieved by applying the strengths for each emissive element 162 to the brightness value for the emissive element 162 using the brightness estimation discussed above. In some embodiments, only a portion of the emissive elements 162 are used to apply the strengths for backlight reconstruction. For each emissive element 162 used in the backlight reconstruction, the emissive element strengths 112 of the emissive element 162 is included in the SVD sets 190 (e.g., up to a number of sets selectable using a set parameter). In each SVD set 190 a grid point coordinate 192 is used to determine how much effect the respective emissive element has on the backlight at the grid point coordinate 192. For instance, a horizontal weight 194 and a vertical weight 196 may be applied to the emissive element strengths 112 using one or more multipliers 198 to apply the horizontal weight 194 and the vertical weight 196. Weighted strengths 204 from the SVD sets 190 are summed together in one or more adders 206 to form weight sum 208.

In some embodiments, the emissive element strengths 112 may indicate a non-uniformity in color. For example, the emissive element strengths 112 may be related to color shifts in the International Commission on Illumination (CIE) 1931 XYZ color space. Based on the non-uniformity in color, chrominance (e.g., (X, Z)) compensation may be activated in the backlight reconstruction. Chrominance compensation data may be stored in the form of ratios Z/Y 210 and X/Y 212. The weighted sum 208 is multiplied by the brightness estimations 118 in multipliers 214, 216, and 218. In the multiplier 214, the weighted sum is multiplied by the ratio Z/Y 219 in addition to the brightness estimations 118, and in the multiplier 216, the weighted sum 208 is multiplied by the ratio X/Y 212 in addition to the brightness estimations 118. Summing circuitries 220, 222, and 224 may be used to sum the scaled weighted sums 208 for the respective paths in the backlight reconstruction component 114. The outputs of the summing circuitries 220, 222, and 224 are each submitted to a XYZ-to-RGB converter 226 that is used to reconstruct the backlight into RGB when backlight color compensation is enabled. For instance, a 3×3 transform may be used to convert the XYZ values computed at each grid point to linear RGB values. When color compensation is not enabled, in some embodiments, luminance may be solely compensated using the Y channel (through the summing circuitry 222).

Furthermore, when backlight color compensation is enabled, a global target color (e.g., an XY color) or a local target color (e.g., an XY color) may be calculated in a target-to-RGB converter 228. This conversion to target color is based at least in part on the luminance in the Y channel using the Z/Y ratio 210 and the X/Y ratio 212 and with Z equaling 1-X-Y.

When color compensation is enabled, the RGB values of the target color (global or local) and the reconstructed values are transmitted to an RGB gain calculator 230 that calculates gains for in RGB values. The RGB gains may be calculated using component-wise division followed by global scaling of the ratios. The component-wise division may be estimated using one of a number (e.g., 16) of polynomials. If additional precision is to be used, the RGB gain calculator 230 may apply one or more update steps using the Newton-Raphson method. Accordingly, the reconstructed backlight at each of the grid points 164 may be converted to RGB gain values using an interpolation engine 234 and pixel coordinates 232.

As may be appreciated, the grid points 164 may be at a lower resolution than pixels of the electronic display 12 to reduce processing/storage costs for determining and/or storing information for each individual pixel. Accordingly, to accommodate compensation at the pixels with a different resolution than the emissive elements 162, the RGB gain values for each grid point 164 may be used to interpolate for pixels between the grid points 164 based on a location of the respective pixels in relation to respective grid points 164. For example, the interpolation may include bilinear interpolation for both vertical and horizontal directions from respective closest grid points 164. In some embodiments, the grid points 164 may have a same resolution as the pixels of the electronic display 12 where backlight information may be determined and/or stored for each individual pixel.

In some embodiments, the backlight reconstruction is to be normalized to an all-on profile 236. The all-on profile 236 represents all emissive elements 162 being set to a same brightness. The all-on profile 236 may be conceptualized as a map of gains. This all-on profile 236 or map of gains is static and defined with the resolution of the grid points 164. The all-on profile 236 is fetched and stored prior to a first frame being displayed following a power up of the electronic display 12. This all-on profile 236 is combined with the weighted luminance in the Y channel using a multiplier 238. The result of the multiplier is then interpolated in an interpolation engine 240 similar to how the output of the RGB gain calculator 230 is interpolated to the pixel resolution.

The interpolated values from the interpolation engines 234 and 240 are transmitted to the backlight compensation component 116 that includes a pixel modifier 242. The pixel modifier 242 modifies the image data 113 to generate the compensated image data 122. In some embodiments, the compensated image data 122 may undergo additional manipulation. For example, the compensated image data 122 may be used to cause a liquid crystal (LC) to open more fully when a backlight is lower than an expected value. Additionally or alternatively, the backlight level of one or more locations may be lowered to reduce power when one or more grid locations indicate that the blacklight level is above a target value.

Components/units discussed herein may include software implemented in the processor, LED processor, other processors/coprocessors using instructions stored in the storage device(s) 22 and/or the memory 20. Additionally or alternatively, various components and/or units of the components/units discussed herein may be implemented with application-specific hardware circuitry, such as an application-specific integrated circuit (ASIC).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
- a plurality of emissive elements;
- brightness estimation circuitry configured to estimate brightnesses of addressable backlight zones of the plurality of emissive elements based at least in part on pixel values of image data;
- a backlight reconstruction and compensation system, comprising:
  - backlight reconstruction circuitry configured to:
    - receive emissive element strength information for the plurality of emissive elements;
    - receive the estimated brightnesses of the addressable backlight zones of the plurality of emissive elements from the brightness estimation circuitry;
    - generate brightnesses at a plurality of grid points based at least in part on the emissive element strength information and the estimated brightnesses of the addressable backlight zones; and
    - calculate pixel gains based at least in part on the brightnesses at the plurality of grid points; and
  - backlight compensation circuitry configured to:
    - receive the pixel gains from the backlight reconstruction circuitry;
    - receive the image data; and
    - adjust pixels of the image data using the pixel gains to compensate for backlight variance of the brightnesses at the plurality of grid points.

2. The system of claim 1, wherein the brightness estimation circuitry comprises statistics circuitry configured to generate statistics relating to display of the image data.

3. The system of claim 1, wherein the emissive element strength information comprises singular value decomposition sets for the plurality of grid points.

4. The system of claim 3, wherein the singular value decomposition sets each comprise decomposed horizontal and vertical weights.

5. The system of claim 3, comprising memory, wherein the backlight reconstruction circuitry is configured to receive the singular value decomposition sets from the memory.

6. The system of claim 5, wherein receiving the singular value decomposition sets from the memory comprises using a direct memory access (DMA) to access the singular value decomposition sets.

7. The system of claim 1, comprising a display comprising the plurality of emissive elements, wherein the addressable backlight zones comprise overlapping zones of the display.

8. The system of claim 7, wherein the brightness estimation circuitry is configured to compensate for brightness differences and color shifts of the plurality of emissive elements.

9. The system of claim 8, wherein the brightness estimation circuitry is configured to enhance contrast while reducing or minimizing halo and flicker artifacts.

10. The system of claim 9, wherein the brightness estimation circuitry comprises an emissive element processor configured to perform compute brightnesses for individual addressable backlight zones based at least in part on pixel values in the image data.

11. The system of claim 10, wherein the plurality of emissive elements are configured to perform local dimming based on the computed brightnesses for the individual addressable backlight zones.

12. The system of claim 1, wherein the brightness estimation circuitry is configured to compute brightness maximums, brightness minimums, brightness averages, en-gamma/de-gamma information, or uniformity statistics for the image data, wherein the brightness estimation is based at least in part on the brightness maximums, brightness minimums, brightness averages, en-gamma/de-gamma information, or uniformity statistics for the image data.

13. The system of claim 1, wherein the backlight reconstruction circuitry is configured to receive pixel coordinates, and the pixel gains are based at least in part on the pixel coordinates.

14. A method for operating a backlight comprising:

estimate, in brightness estimation circuitry, brightnesses of addressable backlight zones of a plurality of emissive elements in the backlight based at least in part on pixel values of image data;

receive, in backlight reconstruction circuitry, emissive element strength information for the plurality of emissive elements;

receive, in the backlight reconstruction circuitry, the estimated brightnesses of the addressable backlight zones of the plurality of emissive elements from the brightness estimation circuitry;

generate, in the backlight reconstruction circuitry, brightnesses at a plurality of grid points based at least in part on the emissive element strength information and the estimated brightnesses of the addressable backlight zones;

calculate, in the backlight reconstruction circuitry, pixel gains based at least in part on the brightnesses at the plurality of grid points;

receive, in backlight compensation circuitry, the pixel gains from the backlight reconstruction circuitry;

receive, in the backlight compensation circuitry, the image data; and adjust, in the backlight compensation circuitry, pixels of the image data using the pixel gains to compensate for backlight variance of the brightnesses at the plurality of grid points.

15. The method of claim 14, wherein the emissive element strength information comprises singular value decomposition sets for the plurality of grid points, wherein the singular value decomposition sets each comprise decomposed horizontal and vertical weights.

16. The method of claim 15, comprising receiving the singular value decomposition sets at the backlight reconstruction circuitry from memory using a direct memory access (DMA) to access the singular value decomposition sets.

17. The method of claim 15, wherein the brightnesses at the plurality of grid points indicate brightnesses from one or more respective emissive elements of the plurality of emissive elements.

18. A tangible, non-transitory, and computer-readable medium having stored thereon instructions, that when executed are configured to cause a processor to:

obtain emissive element strength information for a plurality of emissive elements of an electronic display, wherein the emissive element strength information comprises singular value decomposition sets for the electronic display, and the singular value decomposition sets each comprise decomposed horizontal and vertical weights;

receive an estimated brightnesses of addressable backlight zones of the plurality of emissive elements from brightness estimation circuitry;

generate brightnesses at a plurality of grid points based at least in part on the emissive element strength information and the estimated brightnesses of the addressable backlight zones;

calculate pixel gains based at least in part on the brightnesses at the plurality of grid points; and adjust pixels of image data using the pixel gains to compensate for backlight variance of the brightnesses at the plurality of grid points.

19. The tangible, non-transitory, and computer-readable medium of claim 18, wherein adjusting the pixels of the image data comprises determining a brightness at a pixel by interpolating two or more grid points of the plurality of grid points.

20. The tangible, non-transitory, and computer-readable medium of claim 18, wherein the emissive element strength information comprises color drift information for the plurality of emissive elements, and adjusting the image data comprises compensating for the color drift information.

* * * * *